March 28, 1961     B. LITMAN ET AL     2,976,733
ACCELEROMETER
Filed April 29, 1955     2 Sheets-Sheet 1
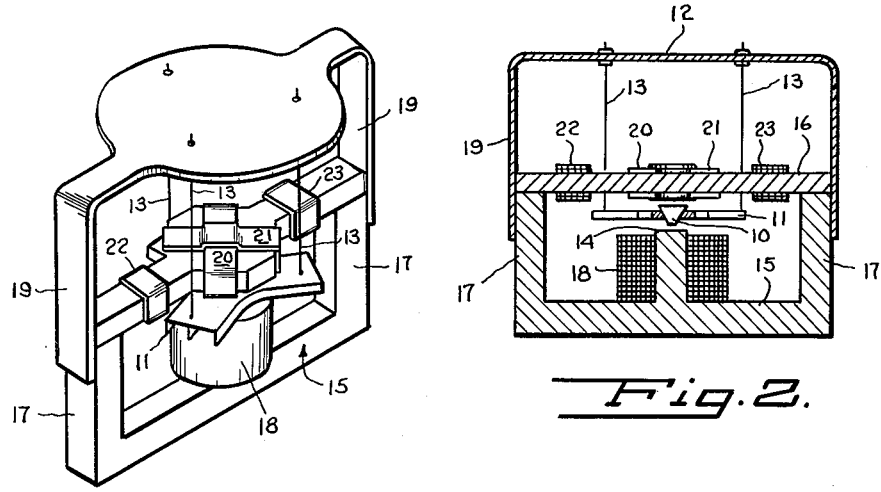
Fig.1.     Fig.2.
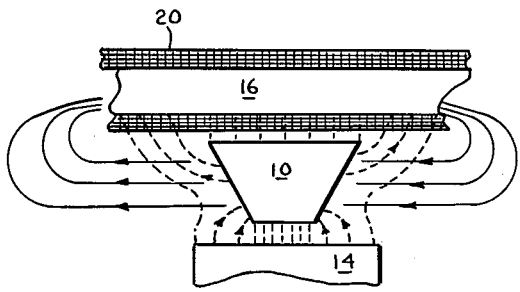
Fig.3.     Fig.4.
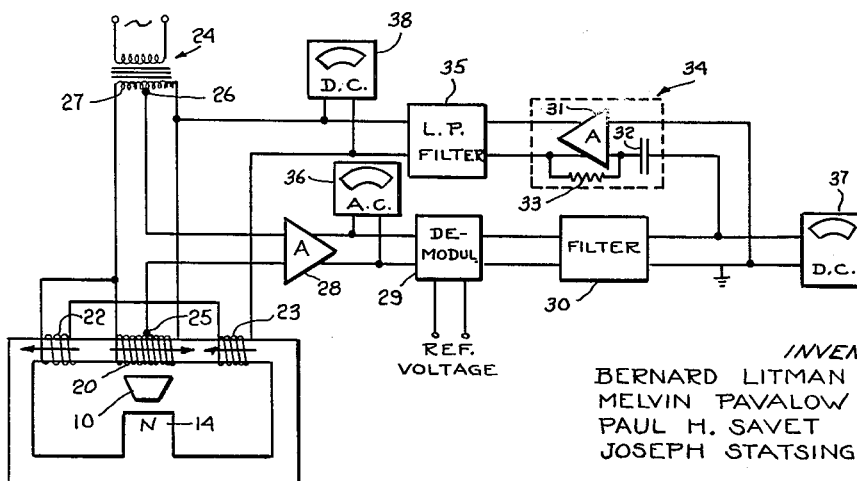
INVENTORS.
BERNARD LITMAN
MELVIN PAVALOW
PAUL H. SAVET
JOSEPH STATSINGER
BY Raymond A. Paquin
ATTORNEY.

United States Patent Office 2,976,733
Patented Mar. 28, 1961

2,976,733

ACCELEROMETER

Bernard Litman, Wantagh, Melvin Pavalow, Hicksville, Paul H. Savet, Westbury, and Joseph Statsinger, Bayside, N.Y., assignors to American Bosch Arma Corporation, a corporation of New York Filed Apr. 29, 1955, Ser. No. 504,762

7 Claims. (Cl. 73—503)

The present invention relates to accelerometers and has particular reference to servo accelerometers.

The principle of servo accelerometers, in which a pendulous mass is restrained from moving in response to an acceleration of its support by applying a counter force to the pendulous mass which is proportional to the deflection of the pendulum with respect to the support, is not new.

The present invention includes a novel transducer in which the pendulous mass is restrained from moving by a change of magnetic field which is controlled by a signal initially produced by displacement of the pendulum.

The pendulum bob is suspended from the frame by means of a wire suspension to provide a transducer capable of measuring accelerations in two directions.

The feedback circuit, which includes an operational amplifier, acts to integrate, with respect to time, the output of the pendulum pickoff device so that an indication of velocity as well as acceleration can be obtained.

For a more complete understanding of the invention, reference may be had to the accompanying diagrams, in which:

Fig. 1 is a pictorial view of the novel transducer;

Fig. 2 is a longitudinal section of the transducer of Fig. 1;

Fig. 3 is a wiring diagram showing the principal electrical connections;

Fig. 4 is a fragmentary view of Fig. 2 on an enlarged scale; and

Figure 5:
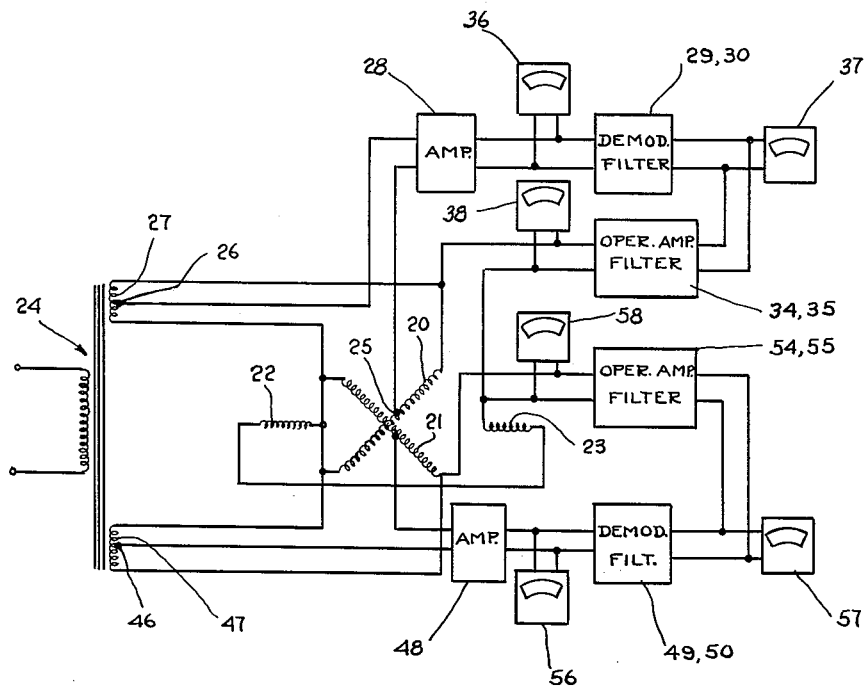
Fig. 5 is a schematic wiring diagraph of the complete system.

Referring now to Figs. 1 and 2, a pendulum bob 10 is held in a three armed non-magnetic spider or disc member 11 which is suspended from plate 12 by the three suspension wires 13. The bob 10 is located in the space between the center leg 14 of the E shaped magnetic core 15 and the armature bar 16 which spans the distance between the outer legs 17 of the core or frame 15. The center leg 14 may be an electro magnet having a winding 18, or it may be a permanently magnetized member. The plate 12 may be supported by extensions 19 which are fastened to the core 15, or by any other suitable means.

Pickoff coils 20 and 21, wound on the enlarged central portion of the armature bar 16, have their magnetic axes perpendicular to one another, and are symmetrically placed with respect to the axis of armature 16. A pair of coils 22 and 23 are wound on the armature 16 and are situated on either side of the pickoff coils 20, 21. The purpose of these coils 22, 23 will become evident later.

Fig. 3 illustrates the electrical circuit containing the pickoff coil 20. Since the circuit containing pickoff coil 21 is similar, only one circuit will be considered in detail.

The pickoff coil 20 is energized by a constant alternating voltage through transformer 24. When the pendulum bob 10 is centered with respect to pickoff coil 20, the voltage across both halves of pickoff coil 20 will be equal and no voltage will appear between the center tap 25 on winding 20 and the center tap 26 on the secondary winding 27 of transformer 24. When the pendulum bob 10 is displaced with respect to pickoff coil 20 an output voltage will appear between the center taps 25 and 26 which is proportional in magnitude to the amount of displacement and corresponding in phase to the direction of displacement of bob 10.

The output voltage between the center taps 25, 26 is applied through amplifier 28 to the demodulator 29 which is of conventional design, and the demodulated output is smoothed in the filter 30. The output of the filter 30, which is a D.C. signal proportional to the displacement of the pendulum bob 10, is applied to the input of the operational amplifier 34 which includes an amplifier 31, a capacitor 32 in series with the input to amplifier 31 and a feedback resistor 33 connected in the usual manner of a differentiating circuit. The output of the amplifier 34 is fed through the low pass filter 35, which removes any stray A.C. signal from the output of the amplifier 34, to the pickoff winding 20. The direct current through winding 20 sets up a magnetic field which acts on pendulum bob 10 and tends to return the bob 10 to the center of winding 20, or the null position. The bucking coils 22 and 23 are connected in series with the winding 20 in a manner such that their magnetic fields oppose the field of winding 20 whence the winding 20 sees an infinite reluctance along armature 16 so that the magnetic field external of winding 20 is forced to pass through the bob 10.

Referring now to Fig. 4 it will be described how the interaction of the magnetic fields of magnet 14 and the winding 20 resulting from the direct current excitation of winding 20 produces the restoring force on the pendulum bob 10.

The solid lines of Fig. 4 represent the lines of force of the magnetic field produced by winding 20, the dotted lines represent the lines of force of the magnetic field produced by the magnet 14, and the arrowheads indicate the direction of the magnetic fields. The particular directions chosen are merely illustrative and are not intended to be limiting in any manner. It will be seen that the horizontal component of the field produced by magnet 14 will add to the field produced by winding 20 on the left hand side of the bob 10 in Fig. 4, while the horizontal field produced by magnet 14 will reduce the field of winding 20 on the right hand side of bob 10. Thus the bob 10, being forced in the direction of the stronger field, will move toward the left in Fig. 4. The magnitude of the force on the bob 10 is proportional to the difference in the squares of the total fields on either side of the bob 10 and is, therefore, proportional to the product of the fields of magnet 14 and winding 20.

Since the force on bob 10 is proportional to the field produced by winding 20 (the force of magnet 14 is constant) and the winding 20 is energized by the D.C. output of amplifier 34, the force on bob 10 is proportional to the output of the amplifier 34, which is the desired action.

In analyzing the operation of the circuit of Fig. 3, let $T$ = transfer function of pickoff 25
$D$ = transfer function of operational amplifier 34
$E$ = voltage output of amplifier 28 and input to operational amplifier 34.
$F$ = forcing function on bob 10 due to acceleration of the support $F'$ = forcing function on bob 10 due to D.C. energization of winding 20 = $ED$
$G$ = gain of amplifier 28

It will be seen that:

$$E = G(F-F')T \quad (1)$$

where $(F-F')$ is proportional to the displacement of bob 10.

Then $$E = G(F-ED)T \quad (2)$$

$$E(1+DTG) = FTG \quad (3)$$

Whence $$E = \frac{FTG}{1+DTG} = \frac{F}{D+\frac{1}{TG}} \quad (4)$$

If $G$ is large compared to unity, then $$\frac{1}{TG}$$

is very small, and $$E = \frac{F}{D} \quad (5)$$

Since $F$ is proportional to acceleration, and the function $$\frac{1}{D}$$

represents an integration with respect to time, the voltage $E$ is proportional to the velocity of the support. The velocity may therefore be read on the scale of an A.C. meter 36 which is connected to indicate the output of amplifier 28 or it may be read on the scale of a D.C. voltmeter 37 which is connected to read the input to operational amplifier 34.

The acceleration of the support may be read on the scale of the D.C. voltmeter 38 which is connected to indicate the output of the operational amplifier 34.

Without departing from the spirit of this invention, the relative positions of the component parts can be varied to provide alternating current signals proportional to acceleration and velocity with direct current signal proportional to acceleration, if desired. In this arrangement, the A.C. displacement signal between center taps 25 and 26 would be amplified and integrated with respect to time and the demodulator would be in the feedback circuit to provide the unidirectional forcing current for energizing the winding 20.

In either case, the velocity or acceleration signals may be used as inputs to computing circuits in addition to being used for indicating purposes as described.

A preferred schematic wiring diagram of the complete system is shown in Fig. 5. The circuit of windings 20, 22 and 23 will be seen to be identical with that shown in Fig. 3. The other pickup and forcing winding 21, which is situated perpendicularly to winding 20, may be connected as shown here so that only one pair of bucking windings 22 and 23 is required.

Thus, winding 21 is connected in series with windings 22, 23 and the output of the operational amplifier and filter 54 and 55 which are similar to the operational amplifier and filter 34, 35. The winding 21 is also connected across the secondary winding 47 of transformer 24 and the signal between the center tap 46 on winding 47 and the center tap on winding 21 is applied through the amplifier 48, demodulator and filter 49, 50 to the input of operational amplifier and filter 54, 55 in the manner previously described in connection with pickoff winding 20.

It will be seen that since the output impedances of the amplifiers and filters 54, 55 and 34, 35 are high, the circuits of windings 20 and 21 will be effectively isolated from one another so that the output of amplifier 34, 35 will not affect the current in winding 21 and the output of amplifier 54, 55 will not affect the current in winding 20.

We claim:

1. An accelerometer having a weight responsive to accelerations, pickoff means for obtaining an electrical signal indicative of the displacement of said weight, electromechanical forcing means for applying a counterforce to said weight, an operational amplifier adapted to differentiate with respect to time, electrical connections between the output of said pickoff means and the input to said operational amplifier, and electrical connections between the output of said operational amplifier and said forcing means for sole energization of said forcing means in response to displacement of said weight, said weight being magnetic, means for producing a first magnetic field perpendicular to the plane of the movement of said weight, said weight being located in said first magnetic field, means for producing a second magnetic field substantially perpendicular to said first magnetic field and in the plane of movement of said weight, said forcing means being adapted to modify said first magnetic field by said second magnetic field.

2. An accelerometer having a weight responsive to accelerations, pickoff means for obtaining an electrical signal indicative of the displacement of said weight, electromechanical forcing means for applying a counterforce to said weight, an operational amplifier, electrical connections between the output of said pickoff means and the input to said operational amplifier, and electrical connections between the output of said operational amplifier and said forcing means for energizing said forcing means, said weight being cone shaped and magnetic means for producing a first magnetic field perpendicular to the plane of movement of said weight, said weight being located in said first magnetic field with the axis of said cone shaped weight parallel to the direction of said first magnetic field and said forcing means being adapted to produce a second magnetic field substantially perpendicular to said first magnetic field, whereby said weight is forced in the plane of movement of said weight.

3. In a device of the character described, a frame, a magnet in said frame producing a first magnetic field, an armature opposite said magnet, a non-magnetic member suspended relative to said magnet between said armature and magnet, a magnetic weight carried by said non-magnetic member, and located adjacent said magnet, coils carried by said armature means for energizing said coils for producing a second magnetic field, said magnetic fields being substantially at right angles to one another, said magnetic weight lying in said magnetic fields whereby said weight is forced in the direction of said second magnetic field.

4. In a device of the character described, a frame, a magnet in said frame producing a first magnetic field, an armature opposite said magnet, a non-magnetic member suspended relative to said magnet between said armature and magnet in said magnetic field, a magnetic weight carried by said non-magnetic member, and located adjacent said magnet, and coils carried by said armature, means for energizing said coils for producing a second magnetic field, said magnetic fields being substantially at right angles to one another, said weight being cone shaped and suspended in said magnetic fields with its longitudinal axis parallel to the direction of the first magnetic field whereby said weight is forced in the direction of said second magnetic field.

5. In a device of the character described, a frame, a magnet in said frame producing a first magnetic field, an armature opposite said magnet, a non-magnetic member suspended relative to said magnet between said armature and magnet, three suspension members supporting said non-magnetic member relative to said magnet, a magnetic weight carried by said non-magnetic member, and located adjacent said magnet and coils carried by said armature, means for energizing said coils for producing a second magnetic field, said magnetic fields being at right angles to one another, said magnetic weight lying in said magnetic fields whereby said weight is forced in the direction of said second magnetic field.

6. In a device of the character described, a frame, a magnet in said frame producing a first magnetic field, an armature opposite said magnet, a non-magnetic member suspended relative to said magnet between said armature and said magnet, a magnetic weight carried by said non-magnetic member, and coils carried by said armature located opposite said magnet, means for energizing said coils for producing a second magnetic field through said weight, said coils comprising crossed coils adjacent said weight and series connected bucking coils on said armature on opposite sides of said crossed coils to force said second magnetic field out of said armature and through said weight.

7. In a device of the character described, a frame, a magnet in said frame producing a first magnetic field, an armature opposite said magnet, a non-magnetic member suspended relative to said magnet between said armature and magnet in said magnetic field, a magnetic weight carried by said non-magnetic member, and coils carried by said armature located opposite said magnet, said coils comprising crossed coils adjacent said weight and bucking coils spaced from said crossed coils, each of said crossed coils being connected in series with both of said bucking coils, separate means for energizing each of said crossed coils separately for producing a second magnetic field through said weight perpendicular to said first magnetic field and in a desired orientation.

References Cited in the file of this patent
UNITED STATES PATENTS

| | | |
|---|---|---|
| 1,746,627 | Babbitt | Feb. 11, 1930 |
| 2,136,219 | Scherbatskoy | Nov. 8, 1938 |
| 2,361,396 | Gross | Oct. 31, 1944 |
| 2,498,997 | McLean et al. | Feb. 28, 1950 |
| 2,570,672 | Hathaway | Oct. 9, 1951 |
| 2,591,921 | Cosgriff et al. | Apr. 8, 1952 |
| 2,691,306 | Beams et al. | Oct. 12, 1954 |
| 2,695,165 | Hansen | Nov. 23, 1954 |
| 2,697,594 | Stanton | Dec. 21, 1954 |
| 2,797,912 | Trostler | July 2, 1957 |
| 2,801,097 | Adamson | July 30, 1957 |
| 2,853,287 | Draper et al. | Sept. 23, 1958 |